(12) United States Patent
Husain et al.

(10) Patent No.: US 6,976,555 B2
(45) Date of Patent: *Dec. 20, 2005

(54) MOTOR VEHICLE STEERING SYSTEM

(75) Inventors: Muqtada Husain, Brownstown, MI (US); Brian Daugherty, Ann Arbor, MI (US); John Oynoian, Taylor, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/610,123

(22) Filed: Jun. 30, 2003

(65) Prior Publication Data

US 2004/0262073 A1 Dec. 30, 2004

(51) Int. Cl.⁷ ................................................ B62D 5/04
(52) U.S. Cl. ........................................................ 180/443
(58) Field of Search ....... 180/443, 402–407; 701/41–43

(56) References Cited

U.S. PATENT DOCUMENTS

| | | | |
|---|---|---|---|
| 3,256,951 A | 6/1966 | Hart | |
| 3,747,428 A | 7/1973 | Waner et al. | |
| 4,363,999 A * | 12/1982 | Preikschat | 318/53 |
| 5,097,917 A | 3/1992 | Serizawa et al. | |
| 5,598,897 A | 2/1997 | Sugiura | |
| 5,791,432 A * | 8/1998 | Fushimi et al. | 180/412 |
| 5,908,457 A | 6/1999 | Hiashira et al. | |
| 6,012,540 A | 1/2000 | Bohner et al. | |
| 6,046,560 A * | 4/2000 | Lu et al. | 318/432 |
| 6,053,273 A | 4/2000 | Shimizu et al. | |
| 6,116,371 A | 9/2000 | Suyama et al. | |
| 6,219,604 B1 * | 4/2001 | Dilger et al. | 701/41 |
| 6,269,903 B1 | 8/2001 | Bohner et al. | |
| 6,370,460 B1 | 4/2002 | Kaufmann et al. | |
| 6,419,043 B1 | 7/2002 | Duval et al. | |
| 6,442,462 B1 | 8/2002 | Nishizaki et al. | |
| 6,459,971 B1 | 10/2002 | Kurishige et al. | |
| 6,470,995 B2 | 10/2002 | Mukai et al. | |
| 6,490,514 B2 | 12/2002 | Kurishige et al. | |
| 6,493,619 B2 | 12/2002 | Kawazoe et al. | |

(Continued)

FOREIGN PATENT DOCUMENTS

EP  1208371 A3  5/2002

(Continued)

OTHER PUBLICATIONS

SS White Technologies-*Flexible Shafts*, Jun. 30, 2003, obtained at internet address: http://www.sswt.com/sswt/flex.html.

Primary Examiner—Lesley D. Morris
Assistant Examiner—Paul Royal, Jr.
(74) Attorney, Agent, or Firm—Brinks, Hofer, Gilson & Lione

(57) ABSTRACT

The present invention comprises a steering system selectively operable in one of three modes: steer-by-wire, electronic power assist steering (EPAS), and manual steering. The steer-by-wire system includes a driver interface system (DIS), a road wheel actuator system (RWAS), and a controller for monitoring and implementing the preferred control strategy. The steering system of the present invention operates normally in a steer-by-wire mode. In each of the EPAS mode and manual mode, the controller causes a clutch mechanism to engage, thus creating a mechanical linkage between portions of the DIS and the RWAS. In the EPAS mode, one of the road wheel actuator or the reaction torque generator is available to assist in the steering operation. Alternatively, in the manual mode, both the DIS and the RWAS are deactivated and the vehicle is steerable through entirely mechanical means.

44 Claims, 9 Drawing Sheets

U.S. PATENT DOCUMENTS

| | | |
|---|---|---|
| 6,496,762 B2 | 12/2002 | Kurishige et al. |
| 6,499,558 B2 * | 12/2002 | Lemanski et al. .......... 180/445 |
| 6,505,703 B2 | 1/2003 | Stout et al. |
| 6,580,989 B1 * | 6/2003 | Husain et al. ................ 701/41 |
| 6,612,395 B2 * | 9/2003 | Moser et al. ............... 180/446 |
| 6,655,709 B2 * | 12/2003 | Sherwin et al. ............. 280/402 |
| 6,715,578 B2 * | 4/2004 | Shimizu et al. ............. 180/444 |
| 2002/0059021 A1 | 5/2002 | Nishizaki et al. |

FOREIGN PATENT DOCUMENTS

| | | |
|---|---|---|
| EP | 1350698 | 8/2003 |
| WO | WO 02/32742 A1 | 4/2002 |

* cited by examiner

MOTOR VEHICLE STEERING SYSTEM

BACKGROUND

The present invention relates to a steering apparatus for a vehicle that directs steerable wheels in response to operator input in which the steerable wheels are not mechanically coupled to the manually steerable member.

BRIEF SUMMARY

A typical automotive vehicle is steered by transmitting operations of a manually steerable member, such as a steering wheel, to a steering mechanism for directing steerable wheels for steering. Generally, the manually steerable member is located inside the vehicle passenger compartment, and the steerable wheels are located at the front of the vehicle. Thus, a suitable steering mechanism is necessary to couple the manually steerable member and the steerable wheels.

A representative steering mechanism is a rack-and-pinion type steering mechanism. In a rack-and-pinion steering mechanism, the rotational motion of the steering wheel is communicated through a steering column to a pinion gear at its distal end. The pinion gear is engaged with a rack gear disposed laterally between the steerable wheels, which in turn are coupled to the rack gear by knuckle arms and tie rods. In this manner, rotation of the steering wheel is translated into the lateral movement of the rack gear, which causes the steerable wheels to pivot in the desired direction. In general, mechanical steering mechanisms are power-assisted by hydraulic or electrical assist units.

In order to overcome limitations presented by mechanical steering systems, it has been proposed to utilize a steering system in which the manually steerable member is not mechanically coupled to the steerable wheels and steering movement is achieved by an electrically controlled motor, a so-called steer-by-wire system. In a steer-by-wire system, a road wheel actuator operates in response to detected values of various steering parameters, such as for example steering wheel angle, vehicle speed, vehicle lateral acceleration, and road wheel angle. The detected values are communicated electronically to the road wheel actuator from sensors, or alternatively, from a centralized controller. Upon receipt and processing of the steering command, the road wheel actuator orients the steerable wheels in the desired direction in accordance with the vehicle steering parameters.

In order to provide a steering "feel" to the vehicle operator, a typical steer-by-wire vehicle will also utilize a reaction torque generator that synthesizes and generates a reaction torque in the manually steerable member. For example, if the manually steerable member is a steering wheel, then the reaction torque generator will generally rotate a shaft coupled to the steering wheel in order to give the vehicle operator a resistive or assisting torque. In general, the magnitude and direction of the reaction torque will be determined by a control system cooperating between the reaction torque generator, the road wheel actuator, and the various vehicle sensing systems.

The adaptability of steer-by-wire systems to myriad situations provides a great number of advantages not apparent in a mechanically steered vehicle. In spite of these advantages, steer-by-wire vehicles are not dominating the current automotive marketplace. It is believed that a hybrid-type steering system is in order to ease the transition in the automotive market from mechanically coupled steering systems to steer-by-wire steering systems. Moreover, a hybrid-type steering system that provides the packaging freedom, weight-savings, and adaptability of a pure steer-by-wire system is needed to demonstrate the benefits of a pure system while maintaining the mechanical redundancies of a hybrid system.

Accordingly, the present invention comprises a steering system selectively operable in one of three modes: steer-by-wire, electronic power assist steering (EPAS), and manual steering. The steer-by-wire system includes a driver interface system (DIS), a road wheel actuator system (RWAS), and a controller for monitoring and implementing the preferred control strategy. The control architecture of the present invention reduces the total number of sensors necessary to operate a steer-by-wire vehicle, consequently reducing the overall cost of the vehicle steering system.

The DIS includes a steerable member that is rotatable about a shaft. The rotation of the steerable member and the shaft is measured by a steering wheel angle sensor, disposed about the shaft. The shaft is coupled to a reaction torque generator for generating a steering feel based upon the applicable steering parameters, such as the vehicle speed, steering wheel angle, yaw rate, rack load, and lateral acceleration.

The RWAS includes a road wheel actuator responsive to control commands from the controller. The road wheel actuator is operatively coupled to a rack and pinion type steering system. Through the controller, the road wheel actuator rotates the pinion gear, which in turn causes the lateral motion of the rack gear thereby steering the road wheels. Like the DIS, the performance of the RWAS is monitored by a plurality of sensors.

The steering system of the present invention operates normally in a steer-by-wire mode, in which information regarding the angular position of the steerable member is combined with other pertinent information to compute a control signal, which the controller directs to the road wheel actuator. As noted, the road wheel actuator then mechanically steers the road wheels through the rack and pinion mechanism of the RWAS. However, the steering system is also adapted for operation in an electronic power assist steering (EPAS) mode and a manual mode in response to a malfunction in any part component of the DIS or RWAS subsystems.

In each of the EPAS mode and manual mode, the controller causes a clutch mechanism to engage, thus creating a mechanical linkage between the steerable member and the rack and pinion system. In the EPAS mode, one of the road wheel actuator or the reaction torque generator is available to assist in the steering operation. Alternatively, in the manual mode, both the DIS and the RWAS are deactivated and the vehicle is steerable through entirely mechanical means. In the event that the system power is cut off or the vehicle is not running, the steering system of the present invention is operable in the manual mode.

The present invention further comprises a flexible steering member that is coupled to the clutch mechanism and the rack and pinion system. Using a conventional I-Shaft mechanical linkage sometimes poses difficulty in alignment, packaging and further limits on placement of DIS. The cumbersome nature of the mechanical system impedes the ease with which one could change the position of the DIS for right-hand and left-hand driven cars, which is one of the major advantages of pure SBW systems. The flexible steering member offers a superior packaging flexibility, weight and cost savings as compared to conventional I-Shaft.

Nevertheless, the flexible steering member has seen little use in automotive technology to date, in part because flexible steering members are not well-suited to a typical mechanically-steered vehicle. For example, a flexible steering member may lack the durability and steering feel present in a conventional steering system. Therefore, despite their packaging flexibility and potential cost and weight savings, flexible steering members have not been utilized in automotive steering systems to date.

However, it is a feature of the present invention that a flexible steering member may be used in conjunction with the SBW system because the flexible steering member will be utilized only in the event of a failure of one of the DIS and RWAS. When the system is functioning in its normal mode there will be no mechanical connection between the driver and the road wheels, and hence the durability and feel issues related to using a flexible steering member are not evident. As the use of the flexible steering member is limited to rare occasions, any performance degradation is outweighed by the tremendous weight, cost and packaging advantages of the flexible steering member.

The flexible steering member, or flex-shaft, permits the hybrid-steering system of the present invention to more closely approximate a pure steer-by-wire system. To wit, the flexible steering member allows for packaging freedom, reduced weight, and the flexibility to adapt the system to a left-hand drive or right-hand drive vehicle with minimal difficulty. Further aspects and advantages of the present invention are described below in more detail with reference to the attending figures.

DETAILED DESCRIPTION OF THE DRAWINGS AND THE PRESENTLY PREFERRED EMBODIMENTS

Figure 1:
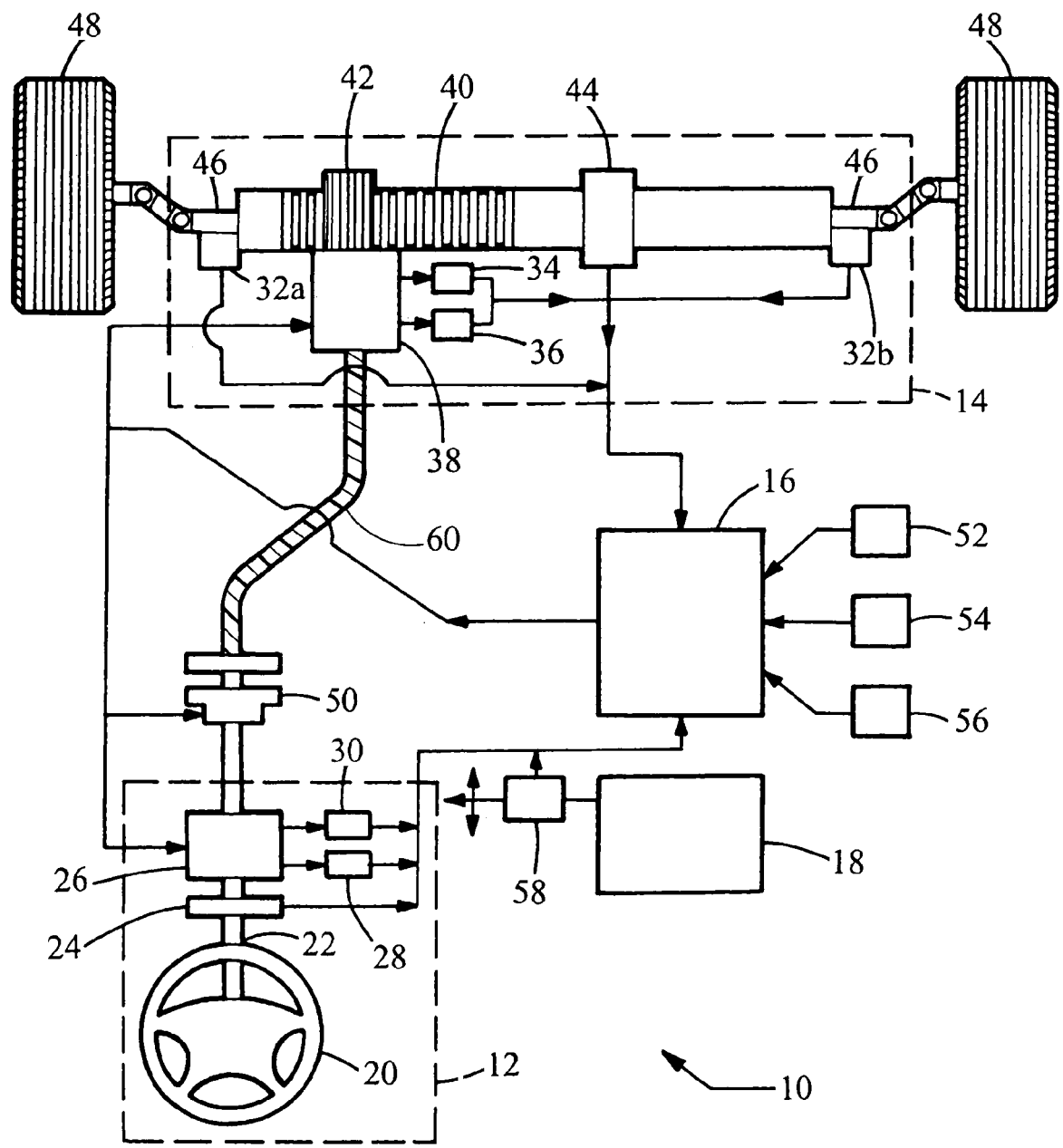
FIG. 1 is a schematic block diagram of a steering system in accordance with a preferred embodiment of the present invention.

In accordance with a preferred embodiment of the present invention, FIG. 1 depicts a schematic block diagram of the steer-by-wire system 10 of the present invention. The steer-by-wire system 10 includes as its primary components a driver interface system (DIS) 12, a road wheel actuator system (RWAS) 14, and a controller 16 for monitoring and controlling the respective systems. The control architecture of the steer-by-wire system 10 of the present invention is based upon the operational independence of the DIS 12 and the RWAS 14. The steer-by-wire system 10 is powered by a battery 18, which provides electrical power to the various electrical components herein.

The DIS 12 includes a steerable member 20 that is rotatable about a shaft 22. The shaft 22 extends from the steerable member 20 towards the RWAS 14. Between the shaft 22 and the RWAS 14 is a clutch mechanism 50, the control of which is discussed further herein. The rotation of the steerable member 20 and the shaft 22 is measured by a steering wheel angle sensor 24, disposed about the shaft 22. In a preferred embodiment, the steering wheel angle sensor 24 as shown includes at least one independent sensing unit, such that measurement redundancy is ensured. The shaft 22 is coupled to a reaction torque generator 26, the operation of which is controlled by the controller 16.

The reaction torque generator 26 generates a prescribed torque upon the shaft 22, thus providing either resistance or assistance to a vehicle operator in rotating the steerable member 20. The performance of the reaction torque generator 26 is monitored by a pair of condition sensors. A reaction torque generator current sensor 28 measures the amount of current utilized by the reaction torque generator, and conveys that measurement to the controller 16. Similarly, a reaction torque generator temperature sensor 30 monitors the temperature of the reaction torque generator 26 and communicates measurements to the controller 16. The foregoing sensors and other sensors associated with the DIS 12 may be referred to herein as the "steering sensors".

The RWAS 14 includes a road wheel actuator 38 responsive to control commands from the controller 16. The road wheel actuator 38 is operatively coupled to a pinion gear 42, which is in turn engaged to a rack gear 40 displaced about a transverse axis of the motor vehicle. The rack gear 40 is coupled to or part of an axle 46, which extends laterally across the motor vehicle to a location suitable for the road wheels 48. Through the controller 16, the road wheel actuator 38 rotates the pinion gear 42, which in turn causes the lateral motion of the rack gear 40, and through a typical steering and suspension system, the pivoting and steering of the road wheels 48.

The performance of the RWAS 14 is monitored by a plurality of sensors. Road wheel position sensors 32a, 32b, are adapted for measuring or estimating the angular position of the road wheels 48 and communicating this value to the controller 16. During steering operation, a rack load sensor 44 measures the load on the rack gear 40, a value that is also transmitted to the controller 16. The operating conditions of the road wheel actuator 38 are monitored by a road wheel actuator temperature sensor 36 and a road wheel actuator current sensor 34. The foregoing sensors and other sensors associated with the RWAS 14 may be referred to herein as the "road wheel sensors".

The steering system 10 of the present invention includes additional components, including a yaw rate sensor 52, a lateral acceleration sensor 54, and a vehicle speed sensor 56. The foregoing sensors are directed primarily at the measurement or estimation of vehicle parameters, and are thus utilized primarily for maximizing the system's steering performance. Additionally, a battery current sensor 58 detects the electrical current available to the steering system 10, and conveys this value to the controller 16.

The steering system 10 operates normally in a steer-by-wire mode, in which information regarding the angular position of the steerable member 20 is combined with other pertinent information to compute a control signal, which the controller 16 directs to the road wheel actuator 38. As noted, the road wheel actuator 38 then mechanically steers the road wheels 48 through the rack and pinion mechanism of the RWAS 14.

However, the steering system 10 is also adapted for operation in an electronic power assist steering (EPAS) mode and a manual mode. Operation in these alternate modes is determined by the controller 16 in response to a malfunction in any part of either the DIS 12 or the RWAS 14. If the battery 18 is unable to supply sufficient electrical current, or if the steering system 10 of the present invention is powered down, then the lack of electrical power causes the clutch mechanism 50 to engage.

In each of the EPAS mode and manual mode, the controller 16 causes the clutch mechanism 50 to engage, thus connecting the shaft 22 to the pinion gear 42. One of the road wheel actuator 38 or the reaction torque generator 26 is available to assist the rotation of the shaft 22 and the pinion gear 42 in the EPAS mode. In the manual mode, both road wheel actuator 38 and the reaction torque generator 26 are deactivated, and rotation of the pinion gear 42 is accomplished solely by manual rotation of the shaft 22.

In a preferred embodiment, the pinion gear 42 and the shaft 22 are coupled by a flexible steering member 60. Specifically, the flexible steering member 60 is coupled at one end of the clutch mechanism 50 and at the other end to the road wheel actuator 38. If the clutch mechanism 50 is engaged in accordance with the EPAS mode or the manual mode, then the flexible steering member 60 provides a mechanical link with sufficient torsional rigidity to affect the steering of the motor vehicle.

Preferably, the flexible steering member 60 is composed of a synthetic material, such as a polymer, that can undergo a prescribed amount of torsional deflection and still convey steering torque. The synthetic material of the flexible steering member 60 will also reduce the weight of the steering system 10, while simultaneously providing a greater range of options with respect to vehicle packaging.

One benefit derived from use of the flexible steering member is the ease of packaging the steering system 10. For example, FIGS. 2A and 2B show components of a steering system 10 that are aligned in a left-hand drive and a right-hand drive configuration, respectively.

Figure 2A:
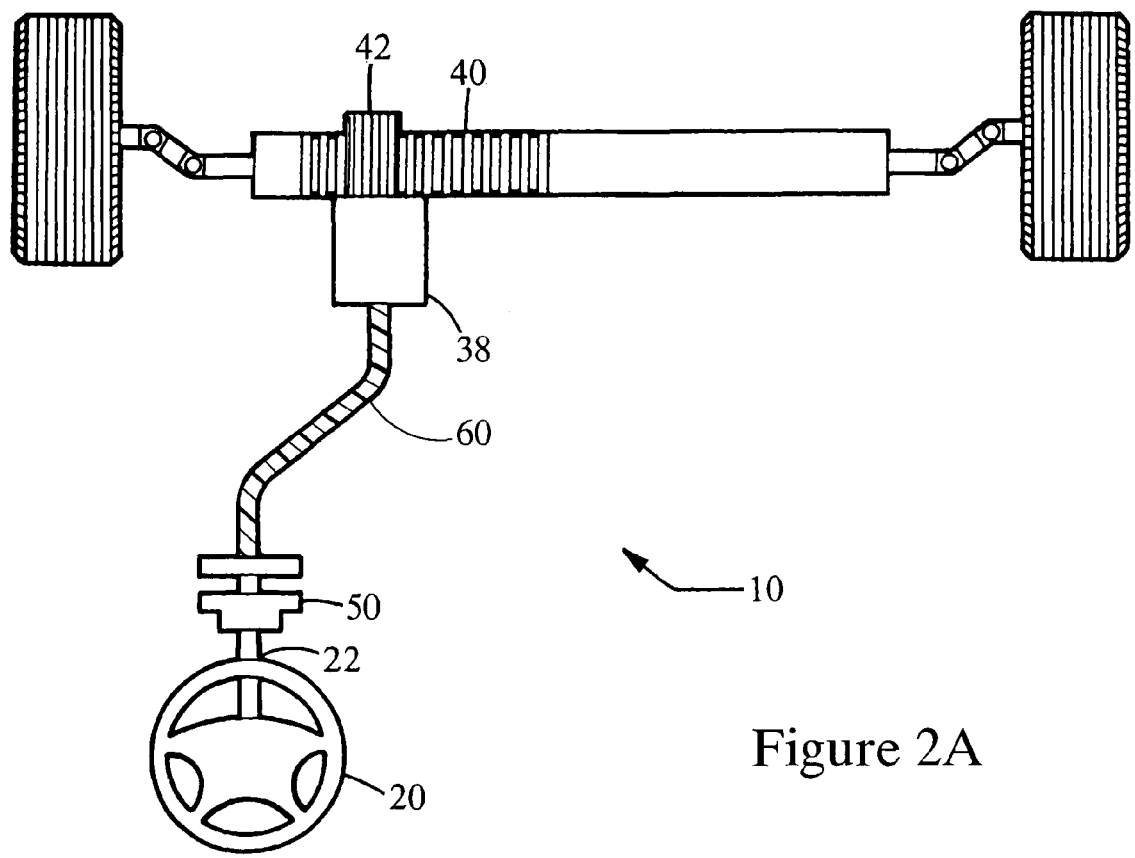
FIG. 2a is a schematic block diagram of a steering system in accordance with the present invention shown in a left-hand drive configuration.

In FIG. 2A, the steering wheel 20 is coupled to the shaft 22 that engages the clutch mechanism 50. The clutch mechanism 50 is further coupled to the flexible steering member 60, which transmits torque to the road wheel actuator 38. The road wheel actuator 38 drives a pinion gear 42 along a rack 40, as presented above. The steering system 10 presented in FIG. 2A is a left-hand drive system of the type commonly found in motor vehicles in the United States and Canada.

Figure 2B:
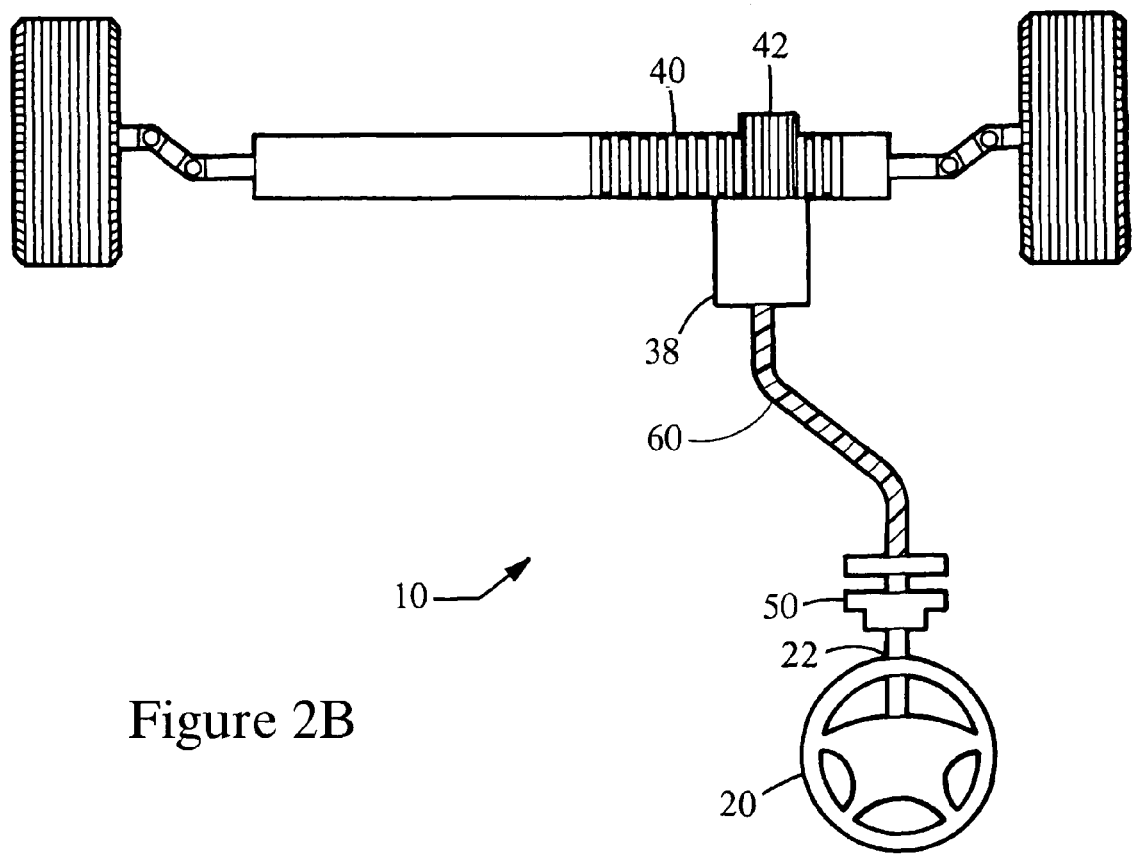
FIG. 2b is a schematic block diagram of a steering system in accordance with the present invention shown in a right-hand drive configuration.

By way of comparison, FIG. 2B shows a right-hand drive system having identical components as the steering system 10 of FIG. 2A, but aligned in an opposite fashion. The right-hand drive system is commonly found in motor vehicles in the United Kingdom, Australia, and other countries.

As noted, the light-weight and ease with which the flexible steering member 60 can be aligned enables a motor vehicle manufacturer to switch between the left- and right-hand drive systems with greater efficiency. As the steering system 10 of the present invention lacks the heavy mechanical components of a typical mechanical steering system, the use of the flexible steering member 60 will generate greater efficiencies in the manufacture and assembly of motor vehicles having steer-by-wire systems, as well as lightening the vehicle and enhancing fuel economy.

Figure 3:
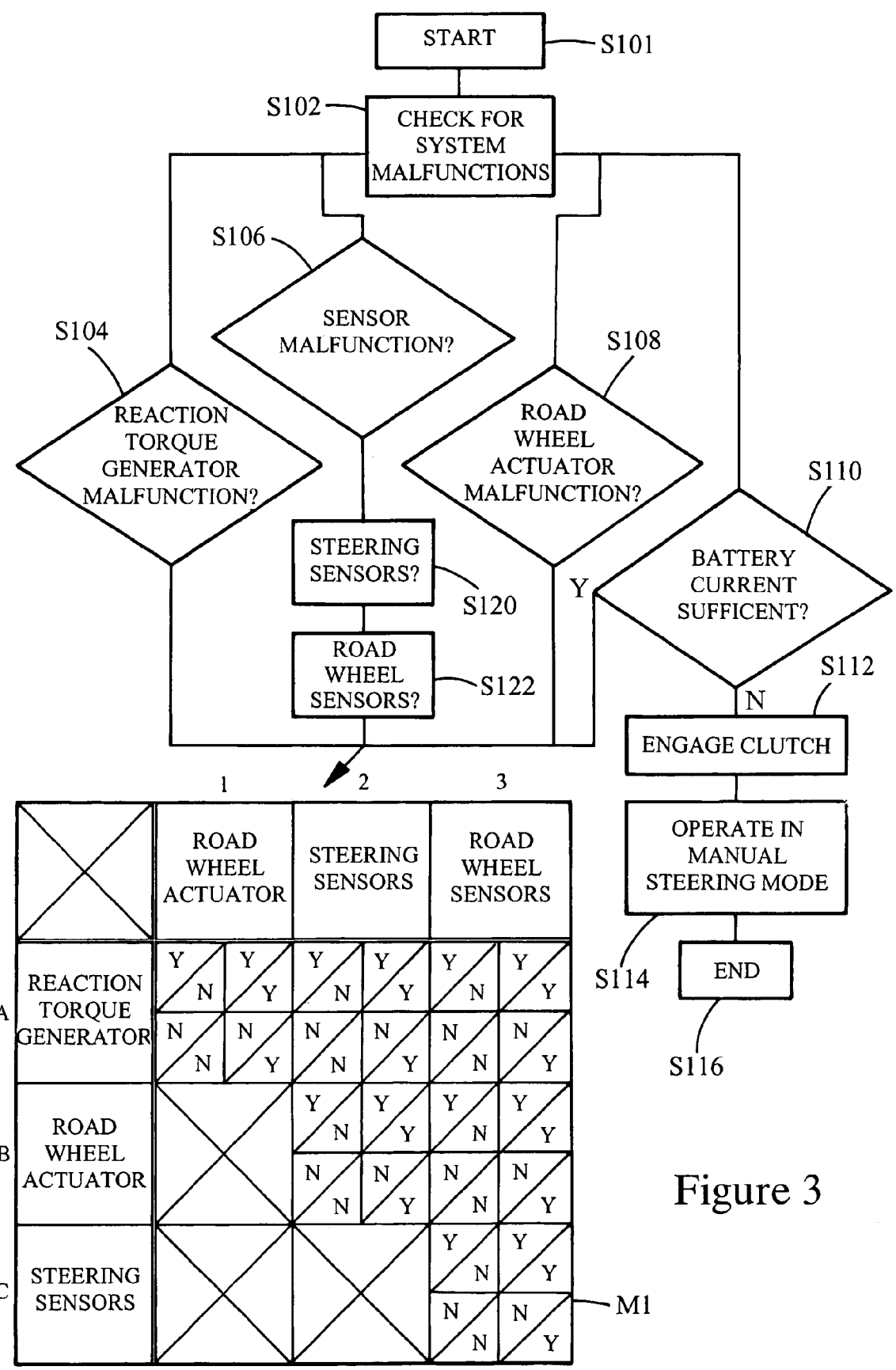
FIG. 3 is a flowchart depicting the top-level controls of the steering system of the present invention, including a decision matrix for system controls.

The control scheme for the steer-by-wire mode, EPAS mode, and manual mode is discussed further herein with reference to FIGS. 3–9. FIG. 3 is a high-level flowchart for the diagnosis and remedy of malfunctions in the steering system 10 of the present invention, beginning with step S101 and step S102, in which the controller 16 checks for system malfunctions. Due to the complexity of the steering system 10, the controller 16 checks for system malfunctions in three dependent domains: the reaction torque generator in step S104, the sensors in step S106, and the road wheel actuator in step S108. With respect to the sensors, the controller 16 inquires as to the functional state of the steering sensors in step S120 and the road wheel sensors in step S122. Because the DIS 12 and the RWAS 14 are comprised of the foregoing actuators and sensors, a more detailed cross-comparison analysis is necessary.

The functional interdependence of steps S104, S120, S122, and S108 is demonstrated clearly in matrix M1. Although any one malfunction is sufficient for the controller 16 to engage the clutch mechanism 50, it is necessary for the controller 16 to further inquire as to the state of other dependent and independent subsystems. For example, a malfunction of the steering wheel angle sensor 24 alone will render the entire DIS 12 inoperable, and thus the clutch mechanism 50 will be engaged. A second malfunction of the reaction torque generator 26 will also render the DIS 12 inoperable, but the controller 16 is not required to take any further mitigating action. In contrast, a third malfunction of the rack load sensor 44 will render the RWAS 14 inoperable, and thus the controller 16 must prepare the steering system 10 for operation in a manual mode.

Consequently, each of the reaction torque generator, road wheel actuator, steering sensors, and road wheel sensors respective conditions are necessary to implement a control strategy. Matrix M1 presents a tabled listing of the possible outcomes of malfunction inquires into these respective domains. For example, submatrix A1 shows the interdependence between the reaction torque generator and the road wheel actuator, resulting in four possible combinatorial outcomes: Y/Y, Y/N, N/Y, and N/N. Similarly, submatricies A2, A3, B2, B3, and C3 show the combinatorial outcomes of the inquiries into the respective domains, as detailed in FIGS. 4–9.

Before proceeding to a detailed discussion of the interdependence of the DIS 12 and RWAS 14, as shown in FIG. 3, in step S110 the controller 16 inquires as to the sufficiency of the battery current. The battery 18 is independent from the other systems, and thus any insufficiency of battery current will result in the mechanical clutch being engaged as shown in step S112. Without sufficient electrical current, the controller 16 does not have an available EPAS mode in which to operate, and thus the steering system 10 must be operated in a pure manual mode as shown in step S114. The controller 16 then resumes the normal monitoring arid control of the steering system 10 in step S116. If the battery current is sufficient, then the controller 16 proceeds to matrix M1, which is followed by the relevant submatricies.

Figure 4:
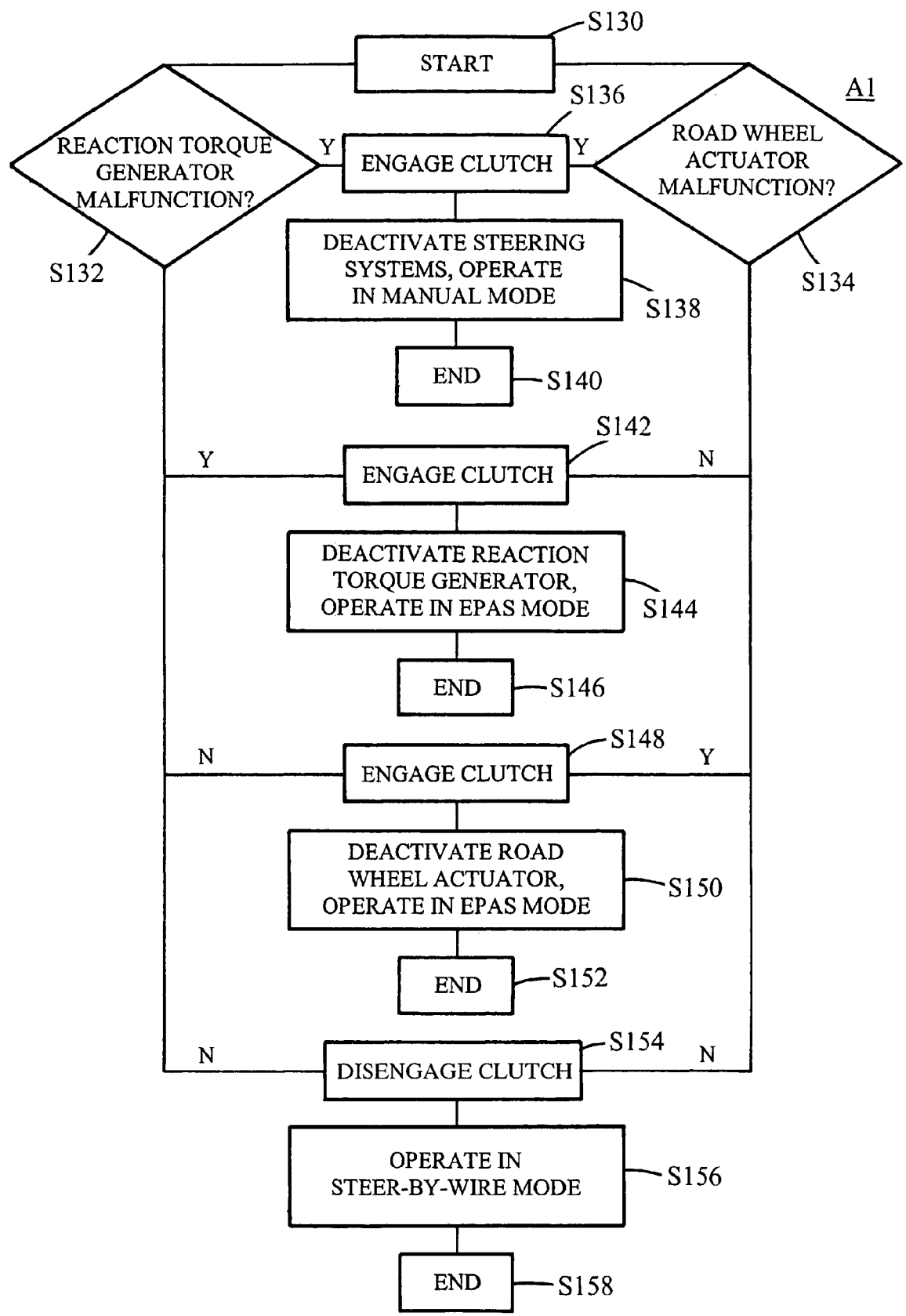
FIG. 4 is a flowchart depicting a submatrix control scheme for the A1 submatrix.

FIG. 4 is a flowchart summarizing the control algorithm executed in submatrix A1, starting with step S130. The controller 16 inquires as to the functional capacity of the reaction torque generator in step S132 and the road wheel actuator in step S134. If, as in step S136, there is a malfunction of both the reaction torque generator 26 and the road wheel actuator 38, the clutch mechanism 50 is engaged. In step S138, the controller 16 deactivates the RWAS 14 and the DIS 12 and operates the steering system 10 in a manual mode. The controller 16 then resumes normal monitoring and control functions in step S140.

If, as in step S142, the reaction torque generator 26 malfunctions but the road wheel actuator 38 is functional, the controller 16 engages the clutch mechanism 50. Because the DIS 12 is not functional, the controller 16 deactivates it and operates the vehicle in a EPAS mode with the road wheel actuator 38 providing the electronic power assist as shown in step S144. The controller 16 then resumes normal monitoring and control functions in step S146.

If, as in step S148, the reaction torque generator 26 is functional but the road wheel actuator 38 is not functional, the controller engages the clutch mechanism 50. Because the RWAS 14 is not functional, the controller 16 deactivates it and operates the vehicle in a EPAS mode with the reaction torque generator 26 providing the electronic power assist as shown in step S150. The controller 16 then resumes normal monitoring and control functions in step S152.

If neither the reaction torque generator 26 nor the road wheel actuator 38 malfunction, as shown in step S154, then the controller 16 twice answers "N" to the malfunction query and therefore maintains the clutch mechanism 50 in a disengaged state. The steering system 10 is then operated in a steer-by-wire mode as shown in step S156 and the controller 16 resumes normal monitoring and control functions in step S158.

Figure 5:
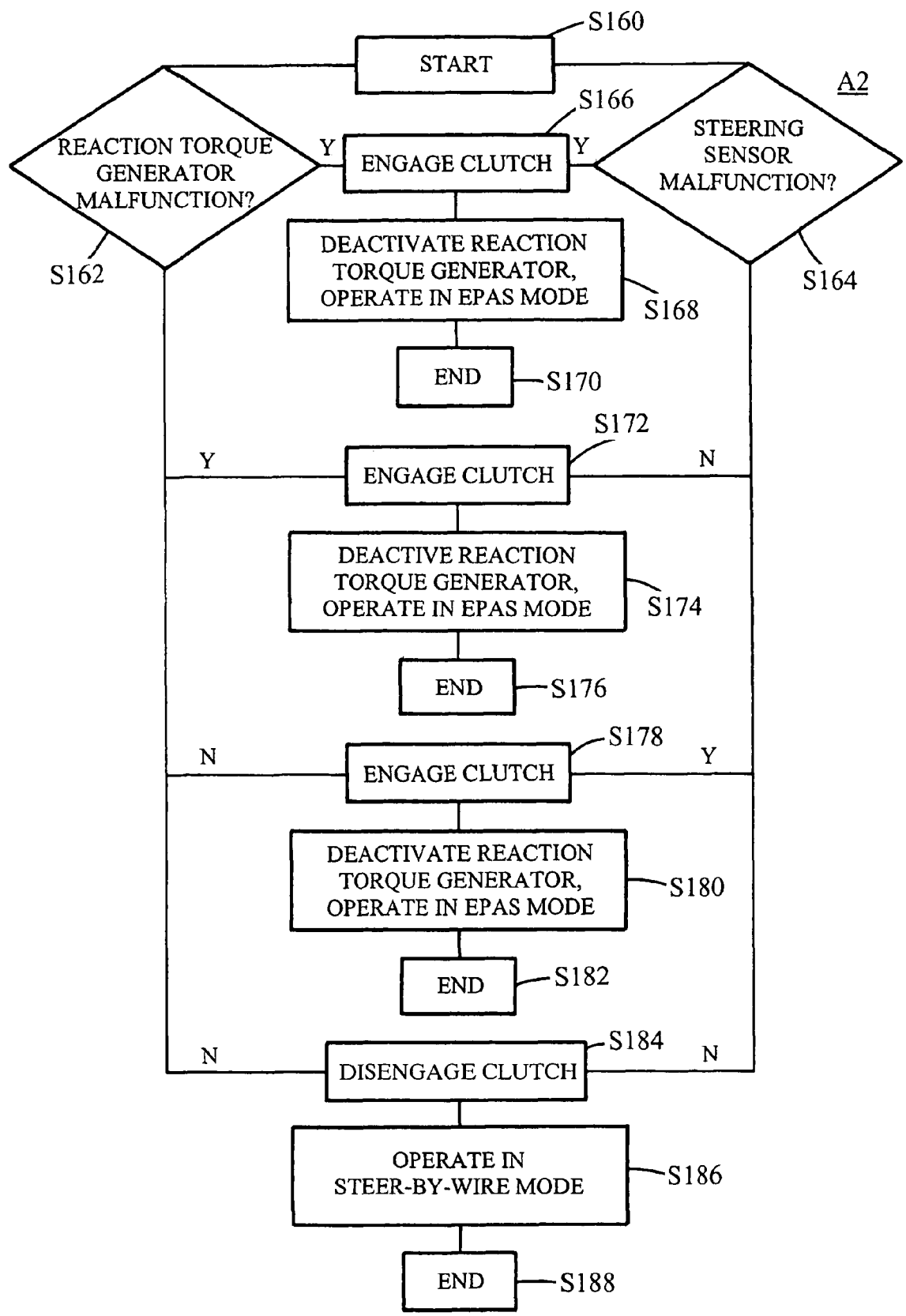
FIG. 5 is a flowchart depicting a submatrix control scheme for the A2 submatrix.

FIG. 5 is a flowchart summarizing the control algorithm executed in submatrix A2, starting with step S160. The controller 16 inquires as to the functional capacity of the reaction torque generator in step S162 and the steering sensors in step S164. If, as in step S166, there is a malfunction of both the reaction torque generator 26 and one of the various steering sensors, the clutch mechanism 50 is engaged. In step S168, the controller 16 deactivates the DIS 12 and operates the steering system 10 in an EPAS mode with the road wheel actuator 38 providing the electronic power assist. The controller 16 then resumes normal monitoring and control functions in step S170.

If, as in step S172, the reaction torque generator 26 malfunctions but the steering sensors are functional, the controller 16 engages the clutch mechanism 50. Because the DIS 12 is not functional, the controller 16 deactivates it and operates the vehicle in a EPAS mode with the road wheel actuator 38 providing the electronic power assist as shown in step S174. The controller 16 then resumes normal monitoring and control functions in step S176.

If, as in step S178, the reaction torque generator 26 is functional but the steering sensors are not functional, the controller engages the clutch mechanism 50. Because the DIS 12 is not functional, the controller 16 deactivates it and operates the vehicle in an EPAS mode with the road wheel actuator 38 providing the electronic power assist as shown in step S180. The controller 16 then resumes normal monitoring and control functions in step S182.

If neither the reaction torque generator 26 nor the steering sensors malfunction, as shown in step S184, then the controller 16 twice answers "N" to the malfunction query and therefore maintains the clutch mechanism 50 in a disengaged state. The steering system 10 is then operated in a steer-by-wire mode as shown in step S186 and the controller 16 resumes normal monitoring and control functions in step S188.

Figure 6:
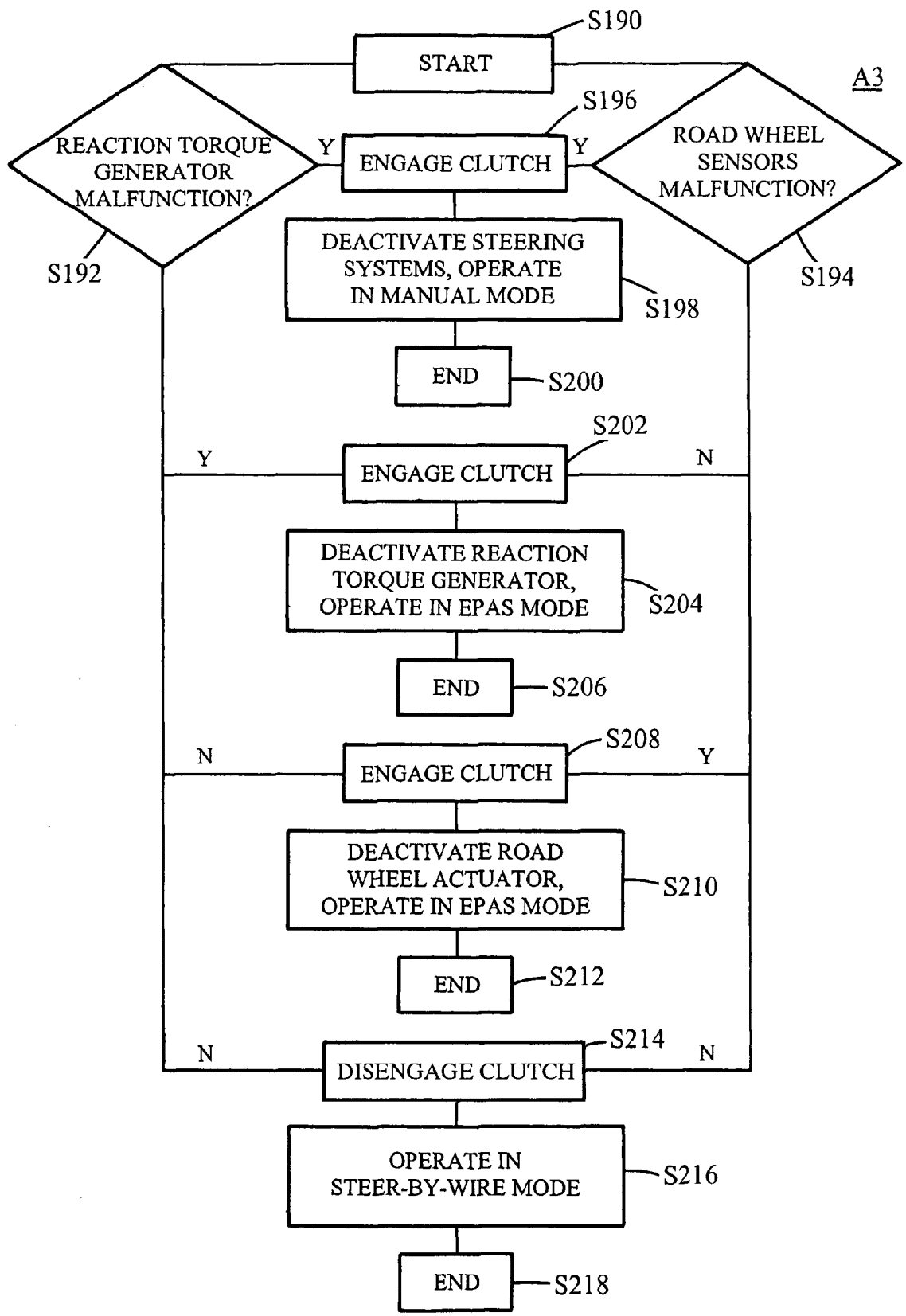
FIG. 6 is a flowchart depicting a submatrix control scheme for the A3 submatrix.

FIG. 6 is a flowchart summarizing the control algorithm executed in submatrix A3, starting with step S190. The controller 16 inquires as to the functional capacity of the reaction torque generator in step S192 and the road wheel sensors in step S194. If, as in step S196, there is a malfunction of both the reaction torque generator 26 and the road wheel sensors, the clutch mechanism 50 is engaged. In step S198, the controller 16 deactivates the RWAS 14 and the DIS 12 and operates the steering system 10 in a manual mode. The controller 16 then resumes normal monitoring and control functions in step S200.

If, as in step S202, the reaction torque generator 26 malfunctions but the road wheel sensors are functional, the controller 16 engages the clutch mechanism 50. Because the DIS 12 is not functional, the controller 16 deactivates it and operates the vehicle in an EPAS mode with the road wheel actuator 38 providing the electronic power assist as shown in step S204. The controller 16 then resumes normal monitoring and control functions in step S206.

If, as in step S208, the reaction torque generator 26 is functional but the road wheel sensors are not functional, the controller engages the clutch mechanism 50. Because the RWAS 14 is not functional, the controller 16 deactivates it and operates the vehicle in an EPAS mode with the reaction torque generator 26 providing the electronic power assist as shown in step S210. The controller 16 then resumes normal monitoring and control functions in step S212.

If neither the reaction torque generator 26 nor the road wheel sensors malfunction, as shown in step S214, then the controller 16 twice answers "N" to the malfunction query and therefore maintains the clutch mechanism 50 in a disengaged state. The steering system 10 is then operated in a steer-by-wire mode as shown in step S216 and the controller 16 resumes normal monitoring and control functions in step S218.

Figure 7:
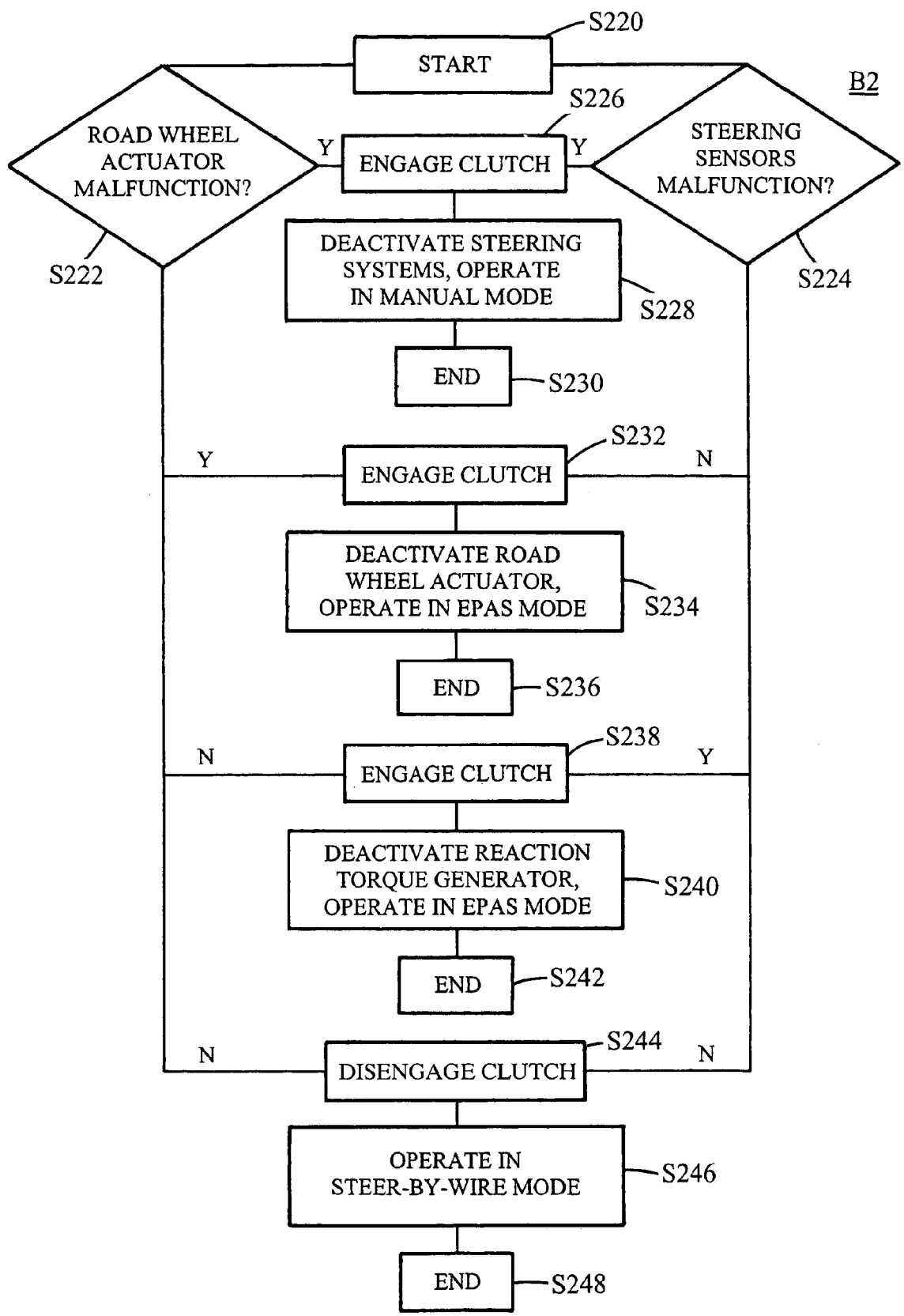
FIG. 7 is a flowchart depicting a submatrix control scheme for the B2 submatrix.

FIG. 7 is a flowchart summarizing the control algorithm executed in submatrix B2, starting with step S220. The controller 16 inquires as to the functional capacity of the road wheel actuator 38 in step S222 and the steering sensors in step S224. If, as in step S226, there is a malfunction of both the road wheel actuator 38 and the steering sensors, the clutch mechanism 50 is engaged. In step S228, the controller 16 deactivates the RWAS 14 and the DIS 12 and operates the steering system 10 in a manual mode. The controller 16 then resumes normal monitoring and control functions in step S230.

If, as in step S232, the road wheel actuator 38 malfunctions but the steering sensors are functional, the controller 16 engages the clutch mechanism 50. Because the RWAS 12 is not functional, the controller 16 deactivates it and operates the vehicle in an EPAS mode with the reaction torque generator 26 providing the electronic power assist as shown in step S234. The controller 16 then resumes normal monitoring and control functions in step S236.

If, as in step S238, the road wheel actuator 38 is functional but the steering sensors are not functional, the controller engages the clutch mechanism 50. Because the DIS 14 is not functional, the controller 16 deactivates it and operates the vehicle in an EPAS mode with the road wheel actuator 38 providing the electronic power assist as shown in step S240. The controller 16 then resumes normal monitoring and control functions in step S242.

If neither the road wheel actuator 38 nor the steering sensors malfunction, as shown in step S244, then the controller 16 twice answers "N" to the malfunction query and therefore maintains the clutch mechanism 50 in a disengaged state. The steering system 10 is then operated in a steer-by-wire mode as shown in step S246 and the controller 16 resumes normal monitoring and control functions in step S248.

Figure 8:
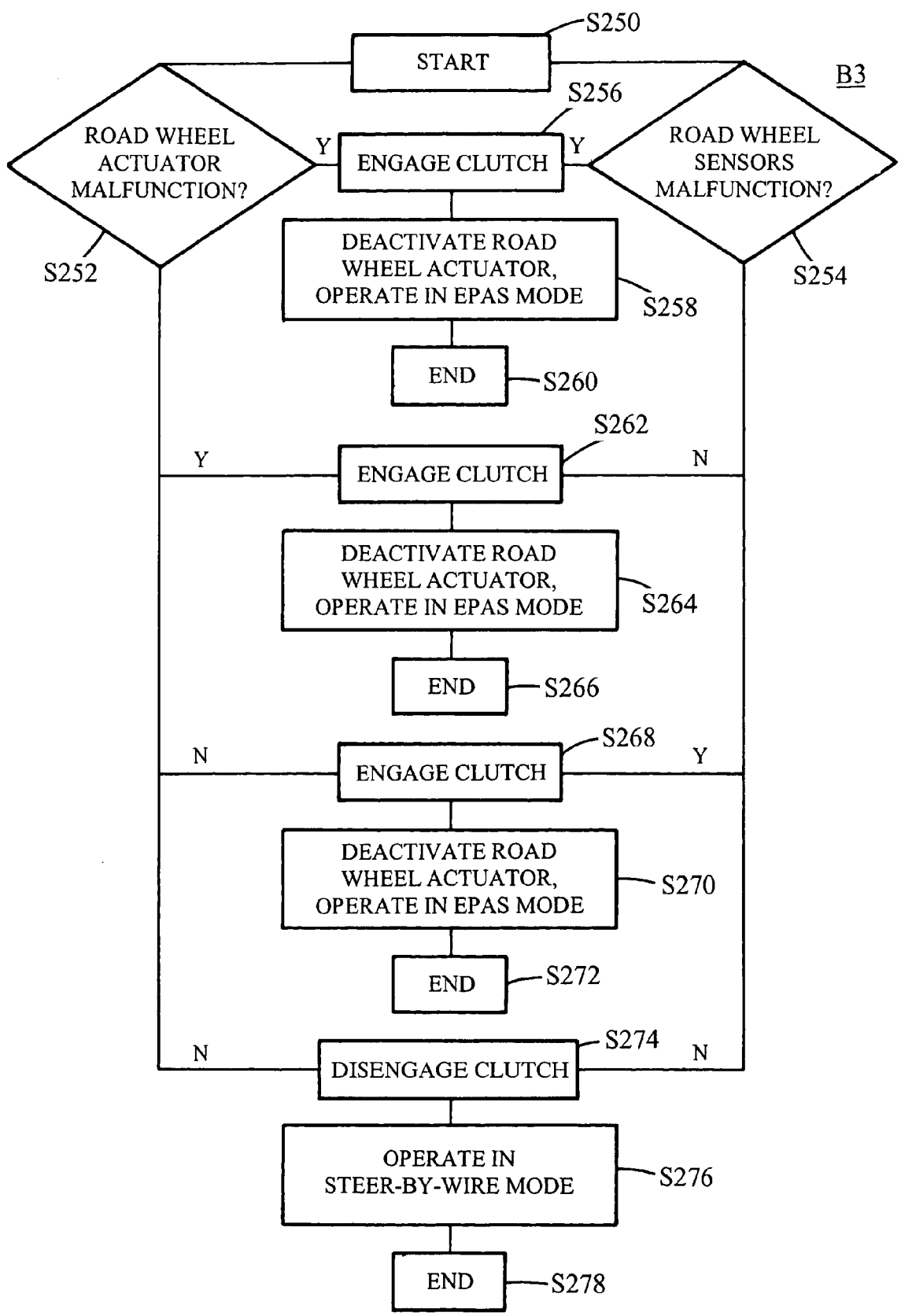
FIG. 8 is a flowchart depicting a submatrix control scheme for the B3 submatrix.

FIG. 8 is a flowchart summarizing the control algorithm executed in submatrix B3, starting with step S250. The controller 16 inquires as to the functional capacity of the road wheel actuator 38 in step S252 and the road wheel sensors in step S254. If, as in step S256, there is a malfunction of both the road wheel actuator 38 and one of the various road wheel sensors, the clutch mechanism 50 is engaged. In step S258, the controller 16 deactivates the RWAS 14 and operates the steering system 10 in an EPAS mode with the reaction torque generator 26 providing the electronic power assist. The controller 16 then resumes normal monitoring and control functions in step S260.

If, as in step S262, the road wheel actuator 38 malfunctions but the road wheel sensors are functional, the controller 16 engages the clutch mechanism 50. Because the RWAS 14 is not functional, the controller 16 deactivates it and operates the steering system 10 in an EPAS mode with the reaction torque generator 26 providing the electronic power assist as shown in step S264. The controller 16 then resumes normal monitoring and control functions in step S266.

If, as in step S268, the road wheel actuator 38 is functional but the road wheel sensors are not functional, the controller engages the clutch mechanism 50. Because the RWAS 12 is not functional, the controller 16 deactivates it and operates the vehicle in an EPAS mode with the reaction torque generator 26 providing the electronic power assist as shown in step S270. The controller 16 then resumes normal monitoring and control functions in step S272.

If neither the road wheel actuator 38 nor the road wheel sensors malfunction, as shown in step S274, then the controller 16 twice answers "N" to the malfunction query and therefore maintains the clutch mechanism 50 in a disengaged state. The steering system 10 is then operated in a steer-by-wire mode as shown in step S276 and the controller 16 resumes normal monitoring and control functions in step S278.

Figure 9:
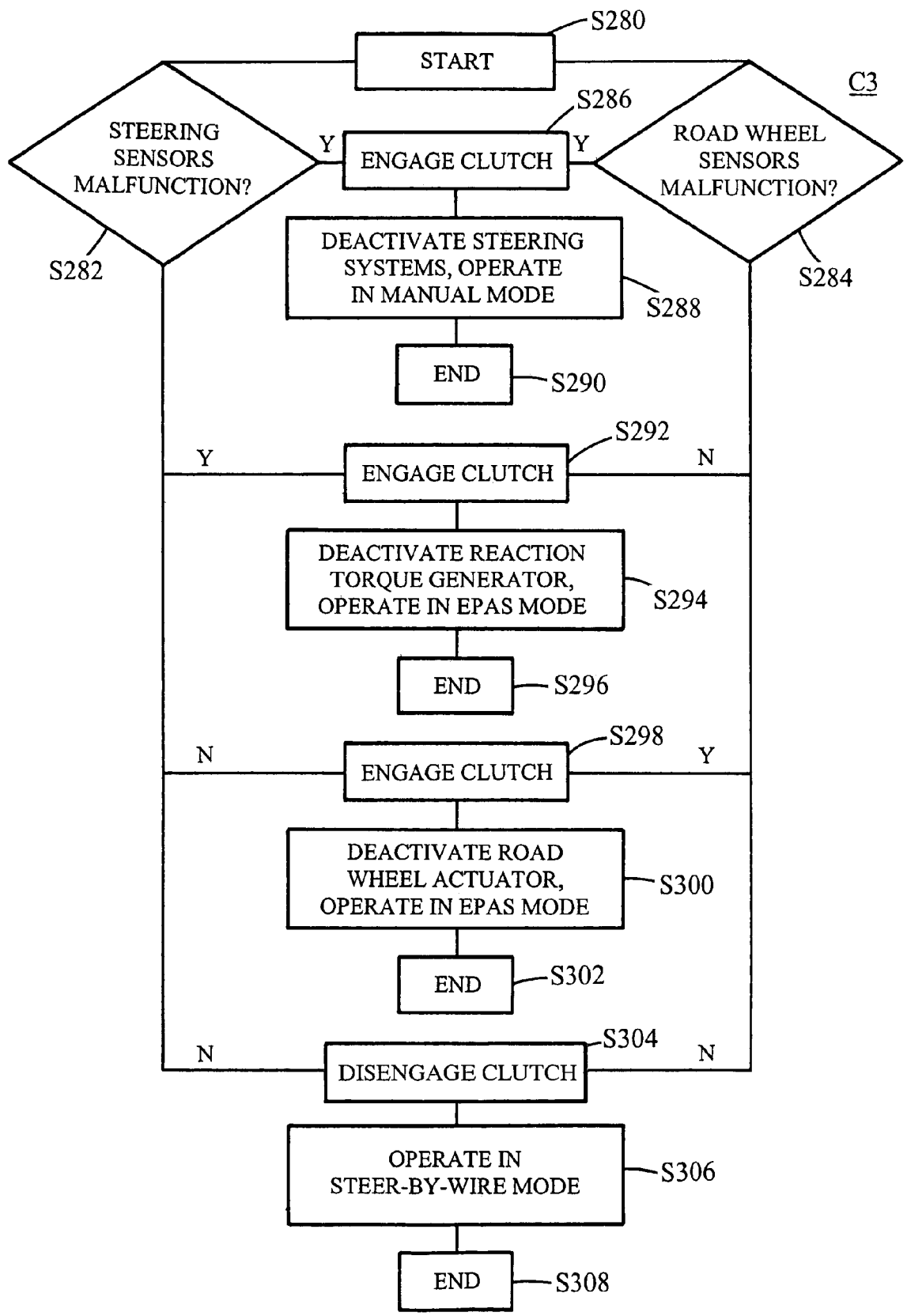
FIG. 9 is a flowchart depicting a submatrix control scheme for the C3 submatrix.

FIG. 9 is a flowchart summarizing the control algorithm executed in submatrix C3, starting with step S280. The controller 16 inquires as to the functional capacity of the steering sensors in step S282 and the road wheel sensors in step S284. If, as in step S286, there is a malfunction of both the steering sensors and the road wheel sensors, the clutch mechanism 50 is engaged. In step S288, the controller 16 deactivates the RWAS 14 and the DIS 12 and operates the steering system 10 in a manual mode. The controller 16 then resumes normal monitoring and control functions in step S290.

If, as in step S292, the steering sensors malfunction but the road wheel sensors are functional, the controller 16 engages the clutch mechanism 50. Because the DIS 12 is not functional, the controller 16 deactivates it and operates the vehicle in an EPAS mode with the road wheel actuator 38 providing the electronic power assist as shown in step S294. The controller 16 then resumes normal monitoring and control functions in step S296.

If, as in step S298, the steering sensors are functional but the road wheel sensors are not functional, the controller engages the clutch mechanism 50. Because the RWAS 14 is not functional, the controller 16 deactivates it and operates the vehicle in an EPAS mode with the reaction torque generator 26 providing the electronic power assist as shown in step S300. The controller 16 then resumes normal monitoring and control functions in step S302.

If neither the steering sensors nor the road wheel sensors malfunction, as shown in step S304, then the controller 16 twice answers "N" to the malfunction query and therefore maintains the clutch mechanism 50 in a disengaged state.

The steering system 10 is then operated in a steer-by-wire mode as shown in step S306 and the controller 16 resumes normal monitoring and control functions in step S308.

The present invention as described in its preferred embodiment thus provides a steering system capable of operation in one of three modes: steer-by-wire, EPAS, and manual steering. The EPAS and manual steering modes are operable due to a flexible steering member that provides increased adaptability and provides numerous advantages associated with a pure steer-by-wire system. The control of each steering mode and the transition between the respective steering modes is determined according to the various control schemes presented herein. It should be apparent to those skilled in the art that the above-described embodiment is merely illustrative of but a few of the many possible specific embodiments of the present invention. Numerous and various other arrangements can be readily devised by those skilled in the art without departing from the spirit and scope of the invention as defined in the following claims.

It is therefore intended that the foregoing detailed description be regarded as illustrative rather than limiting, and that it be understood that it is the following claims, including all equivalents, that are intended to define the spirit and scope of this invention.

What is claimed is:

1. A motor vehicle steering system selectively operable in a steer-by-wire mode, an electronic power assist (EPAS) mode, and a manual mode, the steering system comprising:

a road wheel actuator system including a road wheel actuator adapted for directing an at least one road wheel in accordance with a steering value;

a driver interface system including a reaction torque generator, the driver interface system coupled to the road wheel actuators system, the driver interface system adapted to determine the steering value, and further adapted to communicate the steering value to the road wheel actuator system;

a clutch mechanism selectively coupling the driver interface system and the road wheel actuator system;

a flexible steering member coupled to the clutch mechanism and the road wheel actuator;

a controller adapted to determine one of the steer-by-wire mode, the EPAS mode, or the manual mode, the controller coupled to the road wheel actuator system, the driver interface system, and the clutch mechanism;

a battery to provide electrical current to the driver interface system and the road wheel actuator system, and further comprising a battery current sensor coupled to the controller, the battery current sensor sensitive to fluctuations in battery current;

wherein in response to a driver interface system malfunction, the controller is adapted to deactivate the reaction torque generator, and further wherein the controller controls the road wheel actuator to provide electronic steering power assist;

whereby in the steer-by-wire mode the controller maintains the clutch mechanism in a disengaged state and the controller operates the driver interface system and the road wheel actuator system such that the motor vehicle is electronically steerable;

whereby in the EPAS mode the controller causes the clutch mechanism to engage and selectively causes one of the road wheel actuator system or the driver interface system to provide electronic power assist steering; and whereby in the manual mode the controller causes the clutch mechanism to engage such that the motor vehicle is mechanically steerable.

2. The steering system of claim 1 wherein the driver interface system includes at least one angular position sensor to determine an angular position of a steerable member, a reaction torque generator current sensor, and a reaction torque generator temperature sensor.

3. The steering system of claim 1 wherein the road wheel actuator system further comprises at least one road wheel position sensor, a road wheel actuator current sensor, a road wheel actuator temperature sensor, and a rack load sensor.

4. The steering system of claim 1 wherein the controller is further adapted to receive a set input signals indicative of at least a vehicle speed value, a lateral acceleration value, a yaw rate value, and an ignition mode.

5. The steering system of claim 1 wherein in the EPAS mode, the controller is adapted to control one of the reaction torque generator or the road wheel actuator to generate an assistive torque on the steerable member.

6. The steering system of claim 1 wherein the controller is adapted to detect the driver interface system malfunction being at least one selected from the group of a reaction torque generator malfunction, an angular position sensor malfunction, a reaction torque generator current sensor malfunction, or a reaction torque generator temperature sensor malfunction.

7. The steering system of claim 1 wherein the controller deactivates the reaction torque generator and the road wheel actuator in response to a driver interface system malfunction and a road wheel actuator system malfunction.

8. The steering system of claim 7 wherein the controller causes the clutch mechanism to be engaged such that the motor vehicle is manually steerable in response to a driver interface system malfunction and a road wheel actuator system malfunction.

9. The steering system of claim 1 wherein in response to a threshold battery current value, the controller is adapted to deactivate the reaction torque generator and the road wheel actuator, and further wherein the controller is adapted to cause the clutch mechanism to be engaged such that the motor vehicle is manually steerable.

10. The steering system of claim 1 wherein in response to no electrical current to the driver interface system and the road wheel actuator system, the clutch mechanism is adapted to be engaged such that the motor vehicle is manually steerable.

11. The steering system of claim 1 wherein the road wheel actuator is coupled to a pinion, and further wherein the road wheel actuator is adapted to rotate the pinion such that the pinion causes a rack to move along a transverse axis of the motor vehicle.

12. The steering system of claim 1 wherein the reaction torque generator is coupled to a steerable member, and further wherein the reaction torque generator is adapted to rotate a shaft such that the shaft causes the steerable member to rotate.

13. The steering system of claim 1 wherein the reaction torque generator is further adapted to generate reaction torque in the steer-by-wire mode, and further wherein the reaction torque generator is adapted to generate electronic power assisted steering in the EPAS mode.

14. A steering system selectively operable in a steer-by-wire mode, an electronic power assist (EPAS) mode, and a manual mode, the steering system comprising:
 a road wheel actuator system including a road wheel actuator adapted for directing an at least one road wheel in accordance with a steering value;
 a driver interface system including a reaction torque generator, the driver interface system coupled to the road wheel actuator system, the driver interface system adapted to determine the steering value and further adapted to communicate the steering value to the road wheel actuator system;
 a clutch mechanism selectively coupling the driver interface system and the road wheel actuator system;
 a flexible steering member coupled to the clutch mechanism and the road wheel actuator;
 a controller adapted to determine one of the steer-by-wire mode, the EPAS mode, or the manual mode, the controller coupled to the road wheel actuator system, the driver interface system, and the clutch mechanism;
 a battery to provide electrical current to the driver interface system and the road wheel actuator system, and further comprising a battery current sensor coupled to the controller, the battery current sensor sensitive to fluctuations in battery current; and
 wherein in response to a road wheel actuator system malfunction, the controller is adapted to deactivate the road wheel actuator, and further wherein the controller is adapted to control the reaction torque generator to provide electronic steering power assist;
 wherein the controller is adapted to detect road wheel actuator system malfunction being at least one selected from the group of a road wheel actuator malfunction, a road wheel position sensor malfunction, a road wheel actuator current sensor malfunction, a road wheel actuator temperature sensor malfunction, or a rack load sensor malfunction;
 whereby in the steer-by-wire mode the controller maintains the clutch mechanism in a disengaged state and the controller operates the driver interface system and the road wheel actuator system such that the motor vehicle is electronically steerable;
 whereby in the EPAS mode the controller causes the clutch mechanism to engage and selectively causes one of the road wheel actuator system or the driver interface system to provide electronic power assist steering; and
 whereby in the manual mode the controller causes the clutch mechanism to engage such that the motor vehicle is mechanically steerable.

15. The steering system of claim 14 wherein the driver interface system includes at least one angular position sensor to determine an angular position of a steerable member, a reaction torque generator current sensor, and a reaction torque generator temperature sensor.

16. The steering system of claim 14 wherein the road wheel actuator system further comprises at least one road wheel position sensor, a road wheel actuator current sensor, a road wheel actuator temperature sensor, and a rack load sensor.

17. The steering system of claim 14 wherein the controller is further adapted to receive a set input signals indicative of at least a vehicle speed value, a lateral acceleration value, a yaw rate value, and an ignition mode.

18. The steering system of claim 14 wherein in the EPAS mode, the controller is adapted to control one of the reaction torque generator or the road wheel actuator to generate an assistive torque on the steerable member.

19. The steering system of claim 14 wherein the controller deactivates the reaction torque generator and the road wheel actuator in response to a driver interface system malfunction and a road wheel actuator system malfunction.

20. The steering system of claim 19 wherein the controller causes the clutch mechanism to be engaged such that the motor vehicle is manually steerable in response to a driver interface system malfunction and a road wheel actuator system malfunction.

21. The steering system of claim 14 wherein in response to a threshold battery current value, the controller is adapted to deactivate the reaction torque generator and the road wheel actuator, and further wherein the controller is adapted to cause the clutch mechanism to be engaged such that the motor vehicle is manually steerable.

22. The steering system of claim 14 wherein in response to no electrical current to the driver interface system and the road wheel actuator system, the clutch mechanism is adapted to be engaged such that the motor vehicle is manually steerable.

23. The steering system of claim 14 wherein the road wheel actuator is coupled to a pinion, and further wherein the road wheel actuator is adapted to rotate the pinion such that the pinion causes a rack to move along a transverse axis of the motor vehicle.

24. The steering system of claim 14 wherein the reaction torque generator is coupled to a steerable member, and further wherein the reaction torque generator is adapted to rotate a shaft such that the shaft causes the steerable member to rotate.

25. The steering system of claim 14 wherein the reaction torque generator is further adapted to generate reaction torque in the steer-by-wire mode, and further wherein the reaction torque generator is adapted to generate electronic power assisted steering in the EPAS mode.

26. A method of operating a vehicle steering system, the vehicle steering system having a driver interface system and a road wheel actuator system and further including a clutch mechanism adapted to couple portions of the driver interface system and portions of the road wheel actuator system together, the method comprising the step of:
    providing a flexible steering member to selectively couple the driver interface system and the road wheel actuator system;
    determining a steering value;
    controlling the road wheel actuator system in accordance with the steering value, thereby steering the vehicle;
    generating steering reaction torque in the driver interface system corresponding to the steering value;
    monitoring the road wheel actuator system and the driver interface system;
    engaging the clutch mechanism in response to the detecting of a malfunction in one of the road wheel actuator system or the driver interface system; and
    deactivating the reaction torque generator and controlling the road wheel actuator to provide electronic steering power assist in response to a driver interface system malfunction.

27. The method of claim 26 further comprising the step of monitoring fluctuations in a battery current.

28. The method of claim 27 further comprising the step of deactivating the reaction torque generator and the road wheel actuator, and further comprising the step of engaging the clutch mechanism in response to a threshold battery current value.

29. The method of claim 26 further comprising the steps of determining an angular position of a steerable member, a reaction torque generator current, and a reaction torque generator temperature.

30. The method of claim 26 further comprising the steps of monitoring the position of at least one road wheel, a road wheel actuator current, a road wheel actuator temperature, and a rack load.

31. The method of claim 26 further comprising the steps of receiving a set input signals indicative of at least a vehicle speed value, a lateral acceleration value, a yaw rate value, and an ignition mode.

32. The method of claim 26 further comprising the steps of controlling one of the reaction torque generator or the road wheel actuator to generate an assistive torque on the steerable member in the EPAS mode.

33. The method of claim 26 wherein the driver interface system malfunction includes at least one selected from the group of a reaction torque generator malfunction, an angular position sensor malfunction, a reaction torque generator current sensor malfunction, or a reaction torque generator temperature sensor malfunction.

34. The method of claim 26 further comprising the step of deactivating the reaction torque generator and the road wheel actuation in response to a driver interface system malfunction and a road wheel actuator system malfunction.

35. The method of claim 34 further comprising the step of engaging the clutch mechanism in response to a driver interface system malfunction and a road wheel actuator system malfunction.

36. The method of claim 34 further comprising the step of engaging the clutch mechanism in response to a driver interface system malfunction and a road wheel actuator system malfunction.

37. The method of claim 27 further comprising the step of deactivating the reaction torque generator and the road wheel actuator, and further comprising the step of engaging the clutch mechanism in response to a threshold battery current value.

38. The method of operating a vehicle steering system, the vehicle steering system having a driver interface system and a road wheel actuator system and further including a clutch mechanism adapted to couple portions of the driver interface system and portions of the road wheel actuator system together, the method comprising the steps of:
    providing a flexible steering member to selectively couple the driver interface system and the road wheel actuator system;
    determining a steering value;
    controlling the road wheel actuator system in accordance with the steering value, thereby steering the vehicle;
    generating steering reaction torque in the driver interface system corresponding to the steering value;
    monitoring the road wheel actuator system and the driver interface system;
    engaging the clutch mechanism in response to the detecting of a malfunction in one of the road wheel actuator system or the driver interface system deactivating the road wheel actuator and controlling the reaction torque generator to provide electronic steering power assist in response to a road wheel actuator system malfunction; and
    wherein the road wheel actuator system malfunction includes at least one selected from the group of a road wheel actuator malfunction, a road wheel position sensor malfunction, a road wheel actuator current sensor malfunction, a road wheel actuator temperature sensor malfunction, or a rack load sensor malfunction.

39. The method of claim 38 further comprising the steps or determining an angular position of a steerable member, a reaction torque generator current, and a reaction torque generator temperature.

40. The method of claim 38 further comprising the steps of monitoring the position of at least one road wheel, a road wheel actuator current, a road wheel actuator temperature, and a rack load.

41. The method of claim 38 further comprising the steps of receiving a set input signals indicative of at least a vehicle speed value, a lateral acceleration value, a yaw rate value, and an ignition mode.

42. The method of claim 38 further comprising the steps of controlling one of the reaction torque generator or the road wheel actuator to generate an assistive torque on the steerable member in the EPAS mode.

43. The method of claim 38 further comprising the step of deactivating the reaction torque generator and the road wheel actuation in response to a driver interface system malfunction and a road wheel actuator system malfunction.

44. The method of claim 38 further comprising the step of monitoring fluctuations in a battery current.

* * * * *

UNITED STATES PATENT AND TRADEMARK OFFICE
CERTIFICATE OF CORRECTION

PATENT NO. : 6,976,555 B2  
DATED : December 20, 2005  
INVENTOR(S) : Muqtada Husain et al.

It is certified that error appears in the above-identified patent and that said Letters Patent is hereby corrected as shown below:

<u>Columns 11-12,</u>  
Line 10, after "determine the steering value" insert -- , --.

<u>Column 13,</u>  
Line 6, delete "step of:" and substitute -- steps of: --.

Signed and Sealed this

Thirteenth Day of June, 2006

JON W. DUDAS  
*Director of the United States Patent and Trademark Office*